Oct. 6, 1925.
I. MAIER ET AL
1,556,337
COOKING STOVE
Filed Jan. 16, 1925    2 Sheets-Sheet 1
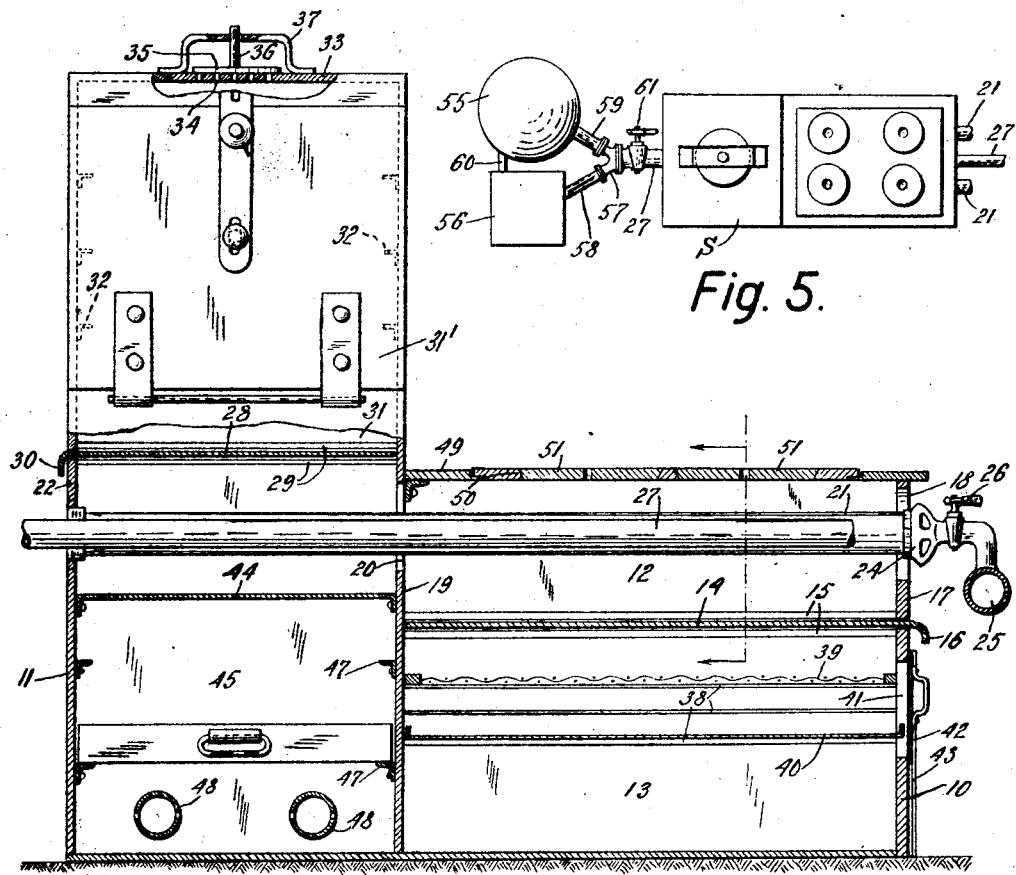
Fig. 1.
Fig. 5.
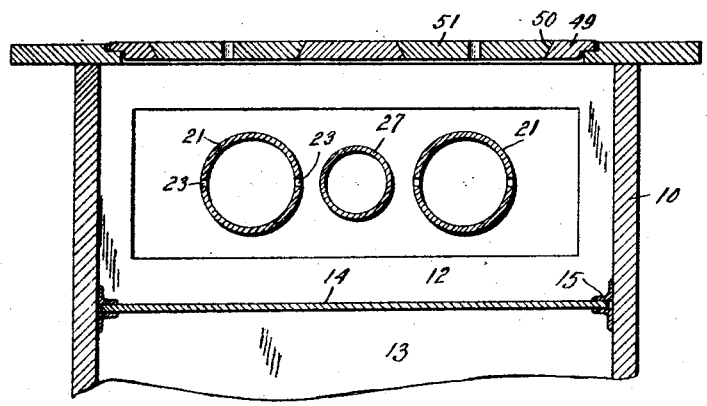
Fig. 2.
INVENTORS
J. Maier & F. Kolenc
BY
Sigmund Herzog
ATTORNEY Oct. 6, 1925.

I. MAIER ET AL

COOKING STOVE

Filed Jan. 16, 1925

1,556,337

2 Sheets-Sheet 2

INVENTORS
I. Maier & F. Kolenc
BY
Sigmund Herzog
ATTORNEY

Patented Oct. 6, 1925.

1,556,337

UNITED STATES PATENT OFFICE.

IRA MAIER AND FLORIAN KOLENC, OF NEW YORK, N. Y.

COOKING STOVE.

Application filed January 16, 1925. Serial No. 2,805.

*To all whom it may concern:*

Be it known that we, IRA MAIER and FLORIAN KOLENC, citizens of the United States and Austria, respectively, and residents of the city of New York, in the county of New York and State of New York, have invented certain new and useful Improvements in Cooking Stoves, of which the following is a specification.

The present invention relates to improvements in cooking stoves, and more particularly to stoves employing gaseous fuel.

One of the objects of the invention is to provide a stove of the type mentioned with water heating means, the hot water being adapted to be used for any suitable purpose.

Another object of the invention is to so construct the stove that with a single burner or a single set of burners cooking utensils on the top of the stove, a broiler compartment and an oven compartment are adapted to be efficiently heated at comparatively low cost.

A further object of the invention is to so design the stove that its top, broiler compartment and oven compartment may be either heated simultaneously, or either one of said two compartments may be cut out, or both compartments may be simultaneously closed to render the burners inoperative in relation thereto; in any one of the cases mentioned, however, heat is supplied to the water heating means.

A still further object of the invention is to provide a cooking stove of the type mentioned which is simple in construction, efficient in operation, durable in use, capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

Two of the many possible embodiments of the invention are illustrated in the accompanying drawings, in which: —

Figure 3:
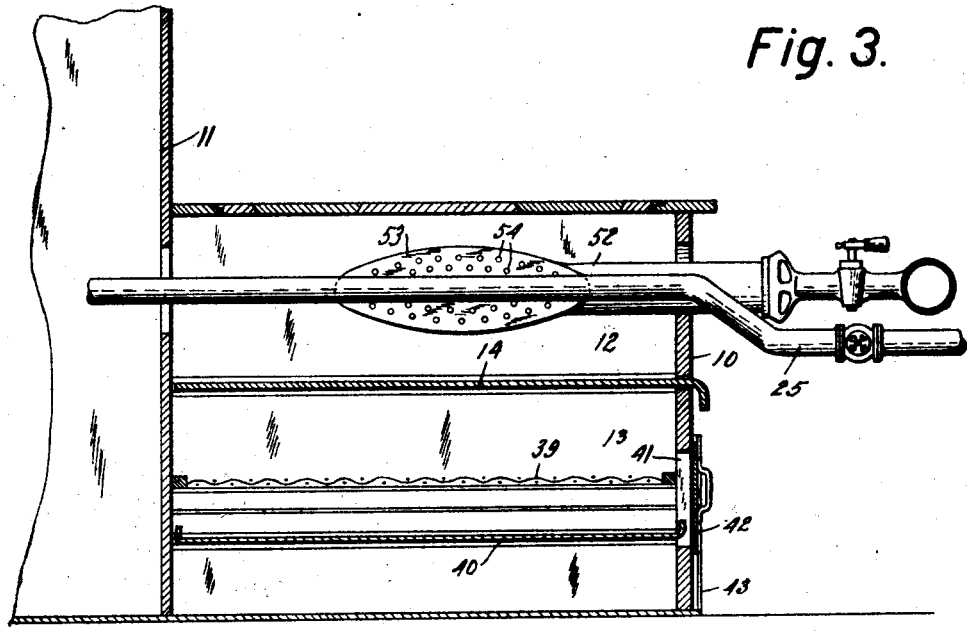
Figure 4:
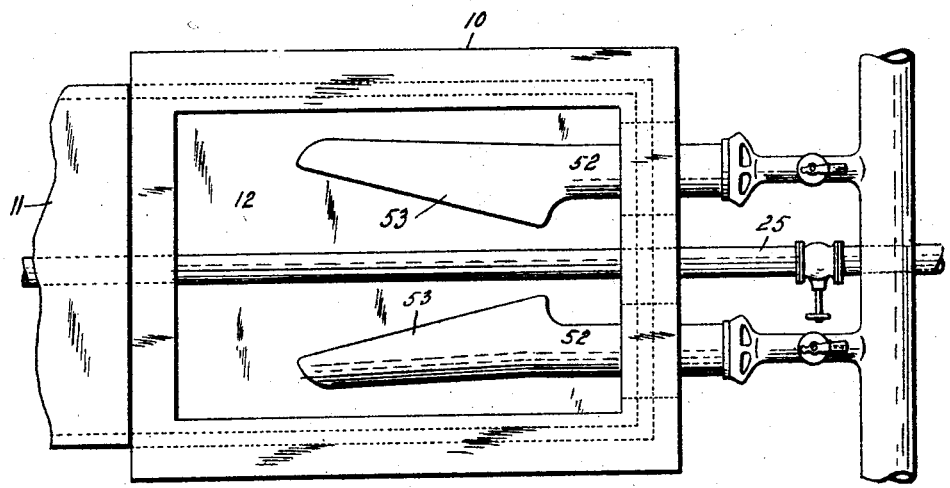

Figure 1 is a longitudinal central section taken through a stove constructed in accordance with the present invention, part of the same being shown in elevation; Fig. 2 is a section taken on line 2—2 of Fig. 1, on a larger scale; Fig. 3 is a section similar to the one shown in Fig. 1 of a portion of a modified stove; Fig. 4 is a top elevation of the modification shown in Fig. 3; and Fig. 5 is a top elevation, showing the use of a hot water container and a steam table in connection with the stove.

Referring now first to Figs. 1 and 2 of the drawings, the stove frame comprises two closed casings 10 and 11, the casing 11 being considerably higher than the casing 10. The casing 10 is adapted to be divided into two compartments, denoted by the numerals 12 and 13, by a horizontal partition 14, the said partition being shiftable in guides 15 on the inner faces of the sides of the compartment 10. The partition is provided with a handle 16, disposed outside of the casing 10, by which handle it may be taken hold of and moved in and out of the casing 10, for a purpose hereinafter to be described. In the end wall 17 of the casing 10 are provided openings 18, and in alignment with the said openings there are provided in the opposite end wall 19 of the casing 10 openings 20, the casing 10 communicating with the casing 11 through the last-mentioned openings.

The compartment 12 constitutes the burner compartment, the burners being in the form of two horizontally disposed pipes 21, which extend throughout the length of the compartment 12 and terminate in the end wall 22 of the compartment 11. These pipes are spaced, as clearly shown in Fig. 2 of the drawings, and are each provided within the compartment 12 with two or more rows of perforations 23, through which the gas issues in the form of jets, the gas intermingling with air as it enters the pipes 21 through a mixing chamber 24 on each of the said pipes. The gas is conducted to the pipes through a supply pipe 25, as usual in constructions of this type, the communication between the said supply pipe and each of the burner pipes being controlled by a cock 26 of any suitable construction. Between the burner pipes 21 is disposed a water pipe 27, the said water pipe entering the compartment 12 through one of the openings 18 in the side wall 17 thereof and leaving the stove through the end wall 22 in the compartment 11, the water being heated in a manner hereinafter to be described and conducted to a storage receptacle and steam table, as will hereinafter appear.

Above the openings 20 in the end wall 19 is disposed in the casing 11 a horizontal partition 28, which is shiftable in guides 29 on the walls of the compartment 11. This partition is provided with a handle 30 outside of the last-mentioned compartment, for manipulating the same in a manner hereinafter to be described. Access may be had to the compartment 31 above the partition 28 through a door 31'. The compartment 31 constitutes an oven, and is provided for this purpose with a plurality of ledges or shelves 32, on which may be placed pans, or other cooking and baking utensils, not shown in the drawings.

In the top 33 of the compartment 30 is provided a plurality of openings 34, controlled by a shutter 35, in the form of a disk. This disk is attached to a spindle 36, which extends slidably through a yoke-shaped guide 37. When the pressure within the compartment 30 exceeds a certain degree, the shutter is automatically lifted, permitting the escape of gases therefrom, the shutter dropping automatically on the top of the compartment 30 when the pressure is released.

The compartment 13, below the partition 14, is made use of for broiling purposes. It has mounted within it a plurality of ledges or shelves 38, a pair of the same for supporting a grill 39, and one of the same a drip-pan 40, as usual in devices of this type. The compartment 13 is provided with an opening 41, controlled, preferably, by a sliding door 42, the said door being mounted in vertical guides 43 on the end wall 17 of the casing 10.

The casing 11 is furthermore provided below the openings 20 with a fixed horizontal partition 44, whereby a compartment 45 is obtained, to which access may be had through a door (not shown). Within this compartment is provided a plurality of ledges or shelves 47 for supporting pans or other baking utensils. In this compartment are arranged one or more burners 48, which are independent of the burners above described. This last-mentioned compartment is made use of in case the stove is to be used for baking purposes only, in which case it would only be a waste of fuel if the entire stove were to be heated.

The burner pipes 21 are disposed at a suitable distance below the top 49 of the compartment 12. This top is provided with a plurality of openings 50, in which are disposed lids 51 of the usual construction. Otherwise the top is unperforated, so that the heat generated by the burners will be confined within the burner compartment, in contradistinction to the stoves heretofore in use in which the stove top is usually of openwork construction.

The operation of the stove is as follows: Fuel being permitted to flow into the burner pipes 21 and the jets issuing through the perforations therein having been ignited, the water pipe 25 is heated and at the same time the stove top 49. If it is intended to use the stove simultaneously for cooking, baking and broiling purposes, the slidable partitions 14 and 28 are withdrawn from the stove, so that not only will the stove top be heated but also the broiling and baking compartments thereof. Both the broiling and baking compartments may be cut off from the heat sources or either one of the same, as required, by inserting both slidable partitions or either one, as desired.

The modification illustrated in Figs. 3 and 4 of the drawings differs from the one above described only in that, instead of the burner pipes 21, burners 52 are used, the latter being in the form of substantially elliptic burner bodies 53, provided with perforations 54, through which the fuel issues. Otherwise the construction and operation of the elements are the same as those described in connection with Figs. 1 and 2 of the drawings.

Figure 5 of the drawings illustrates diagrammatically the stove, denoted by the character S, in combination with a container 55 and a steam table 56. To the water pipe 27, as it leaves the stove, is connected a Y-joint 57, one of the branches of the joint being connected by a pipe 58 with the container, and the other branch of the Y-joint by a pipe 59 with the steam table. The steam table is connected by a pipe 60 with the container. In the pipe 25 is inserted a three-way valve 61. When the valve 61 is in its open position, the hot water, issuing from the stove, flows both to the container and into the steam table, it flowing from the latter into the container through the pipe 60. Hot water may be drawn from the container by means not shown. If it is intended to supply water to the steam table only, the valve 61 is set accordingly, so that the water will flow through the steam table and thence into the container. The valve may also be set to let the hot flow into the container 55 only.

While herein burners of a specific type have been described, any others may be used without departing from the invention, which lies mainly in the provision of a stove wherein a single set of burners is made use of to heat a water pipe, cooking utensils on the top of the stove, a broiler compartment and an oven compartment, either one or both of said compartments being adapted to be closed to render the burners inoperative in relation thereto.

What we claim is:

1. A stove including a burner compartment, a broiler compartment below said burner compartment, means for opening or closing, at will, the communication between said two compartments, said burner compartment including a top, and a burner within said burner compartment below said top, said burner being adapted to heat said top and said broiler compartment when said two compartments are in communication.

2. A stove according to claim 1, comprising a water pipe in said burner compartment in operative relation to said burner.

3. A stove including a burner compartment, a broiler compartment below said burner compartment, an oven compartment, means for opening or closing, at will, the communication between said burner compartment and said broiler compartment, means for opening or closing, at will, the comunication between said burner compartment and said oven compartment, said burner compartment including a top, and a burner within said burner compartment below said top, said burner being adapted to heat said top and said broiler and oven compartments when said last mentioned two compartments are in communication with said burner compartment.

4. A stove according to claim 3, comprising a water pipe in said burner compartment in operative relation to said burner.

Signed at New York, in the county of New York, and State of New York, this 14th day of January, A. D. 1925.

IRA MAIER.
FLORIAN KOLENC.